UNITED STATES PATENT OFFICE.

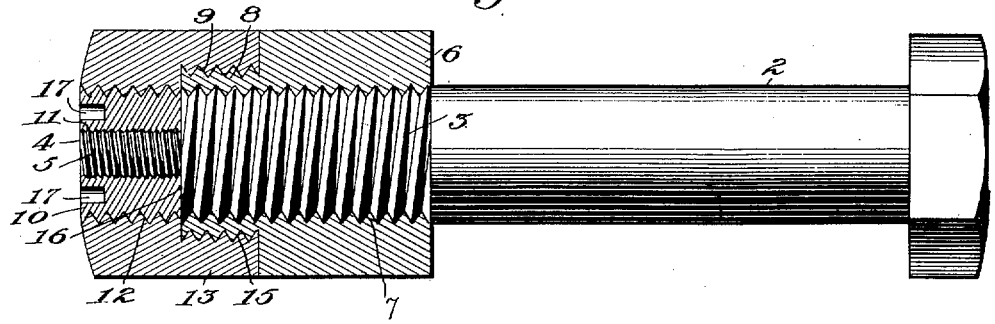

ALBERT H. KNOPF, OF OAK HALL, PENNSYLVANIA, ASSIGNOR OF ONE-HALF TO CHARLES M. McCURDY, OF BELLEFONTE, PENNSYLVANIA.

NUT-LOCK.

No. 857,526.   Specification of Letters Patent.   Patented June 18, 1907.

Application filed February 7, 1907. Serial No. 356,210.

*To all whom it may concern:*

Be it known that I, ALBERT H. KNOPF, a citizen of the United States, residing at Oak Hall, Centre county, Pennsylvania, have invented a new and useful Improvement in Nut-Locks, of which the following is a specification.

My invention relates to that type of nut locks in which a plurality of locking nuts are employed, adapted to interlock or be held in tight engagement with each other and with the threaded surfaces of the bolt with which they engage.

I shall now describe my invention so that others skilled in the art may manufacture and use the same, reference being had to the accompanying drawing, forming part of this specification, in which Figure 1 is a view showing the various parts of the device assembled, the bolt being shown in full lines and the nuts in section. Figs. 2, 3, and 4, are sectional views of the nuts detached.

Like symbols of reference indicate like parts in each.

In the drawing, 2 represents a bolt, provided preferably with left-hand screw-threads 3, and having at its end an extension 4 furnished with right-hand screw-threads 5.

6 is a nut having interior left-hand screw-threads 7 adapted to engage with the left-hand screw-threads 3 of the bolt 2, and having a shoulder 8 provided with right-hand screw-threads 9.

10 is a nut, preferably of the same diameter as the bolt 2, and having a threaded bore 11 adapted to engage with the threaded extension 4 of the bolt, and having also a threaded outer surface 12, the threads of which are less in number to the inch than the threads of the bore 11 and are reversely inclined to the threads 3 of the bolt. 13 is a nut having a threaded bore 14 adapted to engage with the threads 12 of the nut 10 and a larger threaded bore 15 adapted to engage with the threads 9 of the nut 6.

The parts of my improved device are assembled in the following manner:—The nut 6 is first screwed to place on the bolt 2, its left-handed screw bore 7 engaging with the left-handed screwthreads 3 of the bolt. The nut 10 is now screwed tightly to place on the extension 4 of the bolt with its inner end abutting against the end 16 of the larger portion of the bolt. The nut 13 is now screwed to place its smaller threaded bore 14 engaging with the threaded surface 12 of the nut 10, and its larger threaded bore 15 engaging with the threaded shoulder 9 of the nut 6. The nut 10 is then by means of a wrench inserted into the recesses 17 in its outer end, or in any other suitable manner, loosened slightly. This slight loosening of the nut 10 throws the threads 12 of the nut 10 a little out of register with the threads 14 of the nut 13, while the threads 15 of said nut 13 remain in register with the threads 9 of the nut 6, and consequently the nut 13 cannot be unscrewed from its engaging surfaces, much less become loose accidentally. At the same time the difference in the pitch of the threads 11 and 12, or rather because said threads differ in the number to the inch, prevents said nut from independently unscrewing, but will not prevent said slight loosening referred to above. The several nuts are thus held firmly on the bolt. To disengage the same, the nut 10 is again tightened up against the end 16 of the bolt, when the several parts may be easily removed.

I claim:—

1. In a nut-lock, a bolt having screw-threaded portions of different diameters, a nut adapted to engage the inner screw-threaded portion, a nut adapted to engage the outer screw-threaded portion and having an exterior screw-threaded portion differing in the number of screw threads to the inch from its interior screw-threaded surface, and a nut having screw-threads adapted to make screw-threaded engagement with said bolt-nuts, substantially as described.

2. In a nut-lock, a bolt having inner and outer portions of different diameters provided with screw-threads reversely inclined to each other, a nut adapted to engage the inner screw-threaded portion, a nut adapted to engage the outer screw-threaded portion and having an exterior screw-threaded surface differing in the number of screw-threads to the inch from its interior screw-threaded surface, and a nut adapted to make screw-threaded engagement with said bolt-nuts, substantially as described.

3. In a nut-lock, a bolt having a body portion provided with screw-threads, and an integral extension of less diameter than the body portion and provided with screwthreads reversely inclined to those of the body portion, a nut adapted to be screwed on said body portion of the bolt and having exterior screw-threads reversely inclined to its interior screw-threads, a nut adapted to be screwed on to said integral bolt extension and having exterior screw-threads differing in the number of threads to the inch from its interior screw-threads but of the same inclination, and a nut adapted to be screwed on said last named nut and having an enlarged bore at its inner end provided with screw-threads adapted to engage with the exterior screw-threads of the first named nut; substantially as described.

4. In a nut-lock, a bolt having a body portion provided with left-hand screw-threads and an integral extension of less diameter than the body portion and provided with right-hand screw-threads, a nut adapted to be screwed on the body portion of the bolt, a nut adapted to be screwed on said bolt extension and having exterior right-hand screw-threads differing in the number of threads to the inch from its interior screw-threads, and a nut adapted to make screw-threaded engagement with said bolt-nuts; substantially as described.

In testimony whereof I have hereunto set my hand.

ALBERT H. KNOPF.

Witnesses:
H. C. QUIGLEY,
BERTHA A. LAURIE.